Nov. 30, 1926.
P. BASTIEN
BRAKE
Filed Nov. 8, 1923
1,609,106
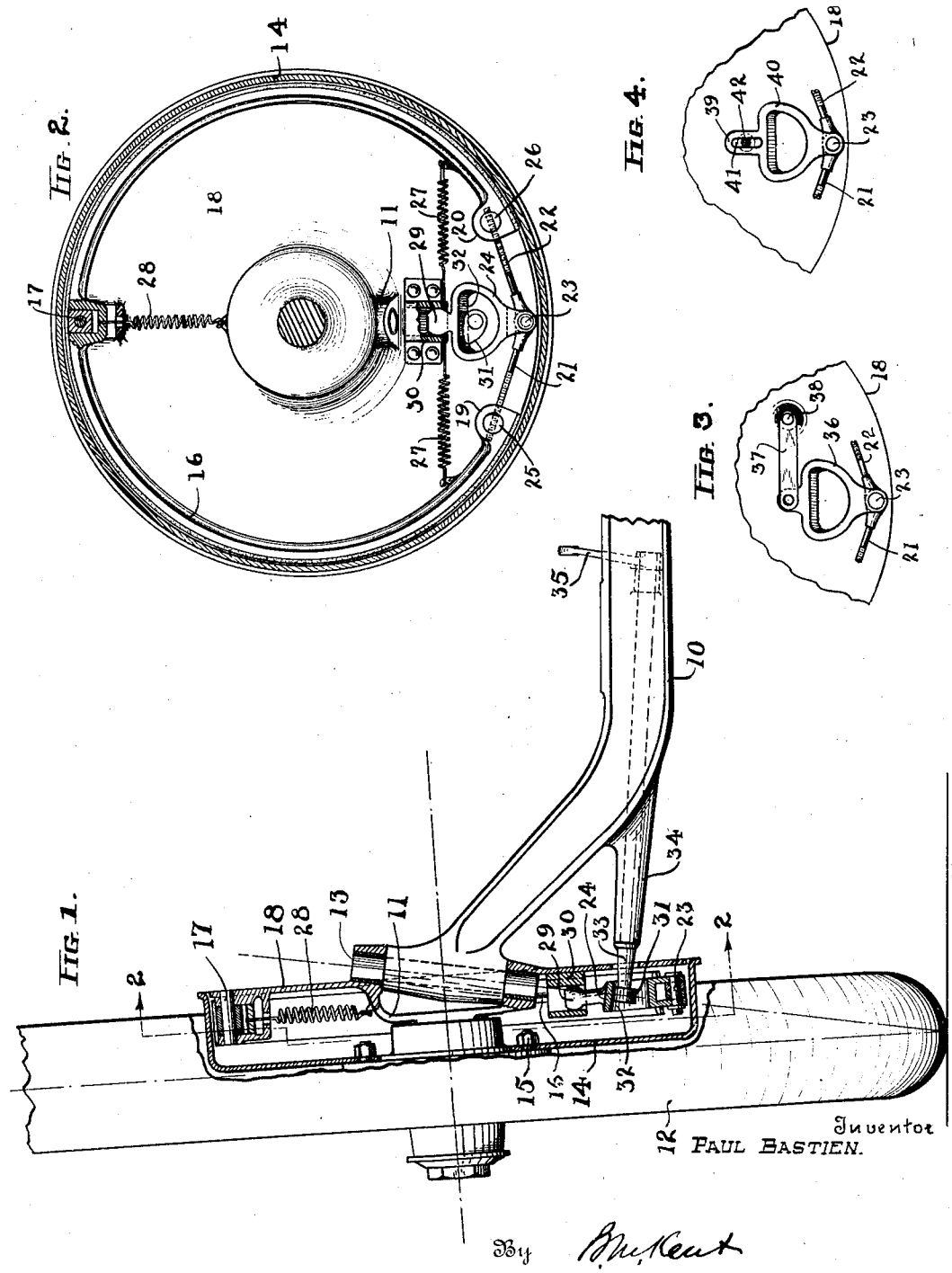
Inventor
PAUL BASTIEN.
By [signature]
Attorney Patented Nov. 30, 1926.

1,609,106

UNITED STATES PATENT OFFICE.

PAUL BASTIEN, OF CLEVELAND, OHIO.

BRAKE.

Application filed November 8, 1923. Serial No. 673,463.

This invention relates to brakes for motor vehicles and more particularly to brakes applied to the steering wheels thereof.

One of the objects of the invention is to provide an efficiency operating brake, of the type referred to, that will be of comparatively simple construction, reliable in operation and capable of readily adjusting itself to wear and unaffected by the steering movements of the wheel.

Other objects and the features of novelty will be apparent from the following description taken in connection with the accompanying drawings, of which:

Figure 1 is an elevation of an axle and steering wheel, embodying my invention, certain parts being shown in section in a vertical plane passing through the axis of the wheel;

Fig. 2 is a section on the line 2—2 of Fig. 1;

Fig. 3 is a fragment of Fig. 2 with modifications of some of the details; and

Fig. 4 is a view similar to Fig. 3 but showing another form of the invention.

Referring to the drawings, 10 indicates an axle, and 11 a steering spindle member on which the wheel 12 is rotatably mounted. The axle 10 and the member 11 are connected by a pivot 13 and, in the form of the invention illustrated in Fig. 1. the axis of the pivot 13 is inclined with respect to the plane of the wheel. This is an illustration of one application of my invention and it is to be understood that the axis of the pivot 13 may be arranged in accordance with any of the customary practices.

A brake drum 14 is secured to the wheel 12 by bolts 15 and on the interior of this brake drum there is a brake band 16 which is anchored at the point 17 to a plate 18 carried by and forming a part of the steering spindle member 11. The brake band 16 is illustrated as of the ordinary type in which the ends 19 and 20 are actuated to apply and release the brake and, according to my invention, the mechanism for actuating the ends 19 and 20 of the brake consists of the toggle links 21 and 22 which have their meeting ends connected by a pivot pin 23, which also connects the links with a yoke 24. The links 21 and 22 have threaded engagement with the pivots 25 and 26, respectively, on the ends of the brake band 16 so that, by removing the pin 23. the ends of the brake band may be relatively adjusted by turning the links 21 and 22. Springs 27, having one end connected to the brake band 16 and the other end suitably anchored, serve to draw the brake away from the brake drum when the brake is released. A spring 28 may also be employed to withdraw the portion of the brake band, adjacent the anchorage 17, from the brake drum.

The yoke 24 has a ball 29 at its upper end which is loosely held in a bracket or bearing member 30 carried by the plate 18. The ball 29 is slidable in the bracket 30 toward and away from the axis of the wheel and the arrangement permits the yoke 24 to oscillate about the axis of the ball 29. This arrangement permits the ends 19 and 20 of the brake band to readily adjust themselves to fit the interior of the brake drum so that the pressure of applying the brake will be distributed equally to its ends. The center of the ball 29 is arranged substantially in line with the axis of the pivot 13.

The yoke 24 is hollow and has arranged therein a cam 31 which engages a surface 32 on the interior of the yoke for the purpose of actuating the latter. The surface 32 is preferably arranged normal to the axis of the pivot 13, as best shown in Fig. 1, so that the steering movements of the wheel do not detrimentally affect the relation between the cam 31 and this surface.

The cam 31 is mounted on the end of a shaft 33 that is carried in a suitable bearing 34 on the axle 10 and this shaft 33 may be actuated by any suitable means such as the arm 35, which is carried by the shaft and which may be operatively connected with the brake operating mechanism of the vehicle.

In the operation of the brake the cam 31 is rotated from the position shown in the drawings, to raise the yoke 24, the ball 29, during this operation, sliding in the bracket 30 toward the axis of the wheel. In case one end of the brake band engages with the brake drum before the other the yoke 24 may be swung about the center of the ball 29 until the other end of the brake band engages the brake drum. From this it will be seen that the arrangement permits the brake to readily adapt itself to the brake drum, through the swinging of the yoke 24 to compensate for unequal wear at the ends of the brake band or inaccurate adjustment of the links 21 and 22. Since the brake and its actuating mechanism are carried by the wheel the yoke 24 turns about the pivot 13 in the steering movements of the wheel, the cam 31 sliding on the surface 32 during these movements. By having the surface 32 normal to the axis of the pivot 13 the steering movements do not affect the operation of the brake and, on the other hand, the brake does not interfere with the steering movements.

In the form of the invention illustrated in Fig. 3 the yoke 36 has its upper end pivotally connected with one end of a link (or pair of links) 37, the opposite end of which is anchored on a stud 38 carried by the plate 18. As will be readily understood the link 37 permits the yoke 36 to move toward and away from the axis of the wheel and, at the same time, permits the yoke to swing about its pivotal connection with the links, thus accomplishing the same purpose as the arrangement of the ball 29 in the bracket 30 of the construction as described.

In the modification illustrated in Fig. 4 an extension 39 on the yoke 40 is provided with a slot 41 which receives the stud 42 that is carried by the plate 18. This arrangement also permits the yoke to move toward and away from the axis of the wheel and to swing about the stud 42.

While I have illustrated what I now consider to be the preferred forms of my invention it is understood that the invention is not limited to these specific forms and I desire to cover, by this patent, all constructions coming within the scope of the appended claims.

Having thus described my invention, what I claim is:

1. In a vehicle, the combination of an axle, a steering spindle member pivoted to said axle, a wheel mounted on said member and having a brake drum, a brake cooperating with said drum having opposed relatively movable ends, a member having one end operatively connected with said brake ends to actuate the latter and anchored to said spindle member by means permitting bodily movement toward and away from the axis of the spindle member and oscillation about the point of anchorage, and a cam carried by said axle and operatively engaging the second-mentioned member.

2. In a vehicle, the combination of an axle, a steering spindle member pivoted to said axle, a wheel mounted on said member and having a brake drum, a brake cooperating with said drum having opposed relatively movable ends, a yoke having one end operatively connected with said brake ends to actuate the latter and anchored to said spindle member by means permitting bodily movement toward and away from the axis of the spindle member and oscillation about the point of anchorage, and a cam carried by said axle and operatively engaging said yoke at a point substantially in alignment with the axis of the pivot which connects the axle and spindle member.

3. In a vehicle, the combination of an axle, a steering spindle member pivoted to said axle, a wheel mounted on said member and having a brake drum, a brake cooperating with said drum having opposed relatively movable ends, a yoke having one end operatively connected with said brake ends to actuate the latter, means anchoring said yoke to said spindle member and relative to which the yoke is adapted to slide and to oscillate, and a cam carried by said axle and projecting into said yoke to actuate the latter.

4. In a vehicle, the combination of an axle, a steering spindle member pivoted to said axle, a wheel mounted on said member and having a brake drum, a brake cooperating with said drum having opposed relatively movable ends, a yoke having one end operatively connected with said brake ends to actuate the latter, means anchoring said yoke to said spindle member and relative to which the yoke is adapted to slide and to oscillate, a shaft arranged on said axle with its axis substantially at right angles to the axis of the pivot which connects the axle and spindle member, and a cam on said shaft cooperating with an interior surface of said yoke to actuate the latter.

In testimony whereof I affix my signature.

PAUL BASTIEN.